(12) United States Patent
Pajaro Gonzalez et al.

(10) Patent No.: US 7,404,419 B2
(45) Date of Patent: Jul. 29, 2008

(54) TUBULAR ELEMENT END PROTECTOR AND TUBULAR ELEMENT COMPRISING SAME

(75) Inventors: Manuel Pajaro Gonzalez, Campana (AR); Guillermo Oscar Dapino, Campana (AR); Matías Gustavo Pereyra, Campana (AR)

(73) Assignee: Siderca Saic, Buenos Aires (AR)

( * ) Notice: Subject to any disclaimer, the term of this patent is extended or adjusted under 35 U.S.C. 154(b) by 0 days.

(21) Appl. No.: 11/441,959

(22) Filed: May 26, 2006

(65) Prior Publication Data

US 2006/0266428 A1 Nov. 30, 2006

(30) Foreign Application Priority Data

May 27, 2005 (AR) ............................. P050102180

(51) Int. Cl.
*B65D 59/06* (2006.01)
(52) U.S. Cl. ................. 138/96 T; 138/96 R; 138/89
(58) Field of Classification Search ............ 138/96 R, 138/96 T, 110; 215/276, 274, 341; 220/319, 220/327, 304
See application file for complete search history.

(56) References Cited

U.S. PATENT DOCUMENTS

| | | | | | |
|---|---|---|---|---|---|
| 1,062,039 | A | * | 5/1913 | Schimmel | 411/268 |
| 1,756,167 | A | * | 4/1930 | Avery | 138/96 T |
| 2,251,897 | A | * | 8/1941 | Severn | 138/96 T |
| 2,316,013 | A | * | 4/1943 | Mulholland | 138/96 T |
| 3,540,757 | A | * | 11/1970 | Neher | 285/21.1 |
| 4,111,331 | A | * | 9/1978 | Summers | 220/319 |
| 4,157,100 | A | * | 6/1979 | Turk | 138/96 T |
| 4,487,228 | A | * | 12/1984 | Waldo et al. | 138/96 T |
| 4,655,256 | A | * | 4/1987 | Lasota et al. | 138/96 T |
| 5,452,749 | A | * | 9/1995 | Johnson et al. | 138/96 T |
| 6,135,156 | A | | 10/2000 | Donoho et al. | 138/89 |
| 6,196,270 | B1 | | 3/2001 | Richards et al. | 138/96 T |
| 6,367,508 | B1 | | 4/2002 | Richards et al. | 138/96 T |

\* cited by examiner

*Primary Examiner*—Patrick F Brinson
(74) *Attorney, Agent, or Firm*—Volpe and Koenig PC

(57) ABSTRACT

A protector for the ends (2) of tubular elements (1), which comprises:
  a ring (3) made from a deformable material, wherein the external surface of one of the ends thereof has a conical thread (4); and
  a threaded cap (6) made from a deformable material, which comprises a closed end (C) and an open end (A), wherein the internal surface of said open end (A) includes a conical thread (5) which matches that of the external end of ring (3).

A tubular element (1) which comprises the threadless protector is also disclosed.

7 Claims, 4 Drawing Sheets

TUBULAR ELEMENT END PROTECTOR AND TUBULAR ELEMENT COMPRISING SAME

FIELD OF INVENTION

The present invention refers to a protector for the ends of a tubular element and a tubular element comprising same. More specifically, the present invention refers to a protector for the ends of tubular elements consisting of two parts: a threaded cap and a threaded ring cooperating between each other, said protector not to be screwed to the threaded end of said tubular element.

BACKGROUND

At present there exists a wide range of threaded protectors, some of which are mentioned below by way of reference.

U.S. Pat. No. 6,135,156 discloses a closure for a tubular element open ends, wherein said open ends adopt the form of a threaded sleeve and are coupled to a cap with annular skirt which covers said open ends. Said cap with annular skirt is attached to the ends of said tubular element by means of a nut which thread matches that of the sleeve.

U.S. Pat. No. 6,196,270 and U.S. Pat. No. 6,367,508 disclose threaded protectors intended for the protection of threads of tubular elements ends, said protectors including a base portion, a threaded portion which axially extends from a first end of the base portion, said thread portion matching the threaded portion of the tubular elements ends, said protectors being indistinctly configured as male or female protectors, further including elongated annular abutting elements which axially extend from a second end of the base portion. Abutting elements are of average length and width such that the relation between both magnitudes is of at least 2.

Present threaded protectors are difficult to fit due to a possible crossing between protector and tube, they do not seal well and thus allow water and dust to enter, they are not easy to remove in situ, and they are not recyclable because they sweep grease off the tubular element when same are threaded whereby said grease remains on the protector wall. Upon contacting the tubular element thread they contaminate same with metal or plastic particles. Protectors may have a wide diversity of threads, which makes it difficult to standardized the product, being necessary in some cases the delivery of certain protectors by air when facing an urgency due to lack of stock, which implies higher costs.

SUMMARY

Accordingly, and in order to solve the above mentioned problems, the Applicant has developed a fully novel and inventive protector as is hereinbelow described.

It is thus an object of the present invention a protector for tubular elements ends, which protector comprises:
  a ring made from a deformable material, wherein the external surface of one of its ends exhibits a conical thread; and
  a threaded cap made from a deformable material, one of the ends of said cap being closed and the other end being open, wherein the internal surface of said open end includes a conical thread which matches that of the external end of said ring.

Another object of the present invention is a tubular element which ends are covered by the threadless protector according to the invention.

Thus, the protector according to the invention exhibits the following advantages:

universal use, for tubes of any diameter;
reduction of variety and quantity of protectors at threaded tubular elements recovery licensed stores;
reutilization thereof without discarding any piece, easily recycled as no thread contacts grease of the threaded end of the tubular element; and
easy inspection of tubular elements ends.

BRIEF DESCRIPTION OF THE DRAWING(S)

There follows a brief description of the drawings, in which.

DETAILED DESCRIPTION OF THE PREFERRED EMBODIMENT(S)

Figure 1:
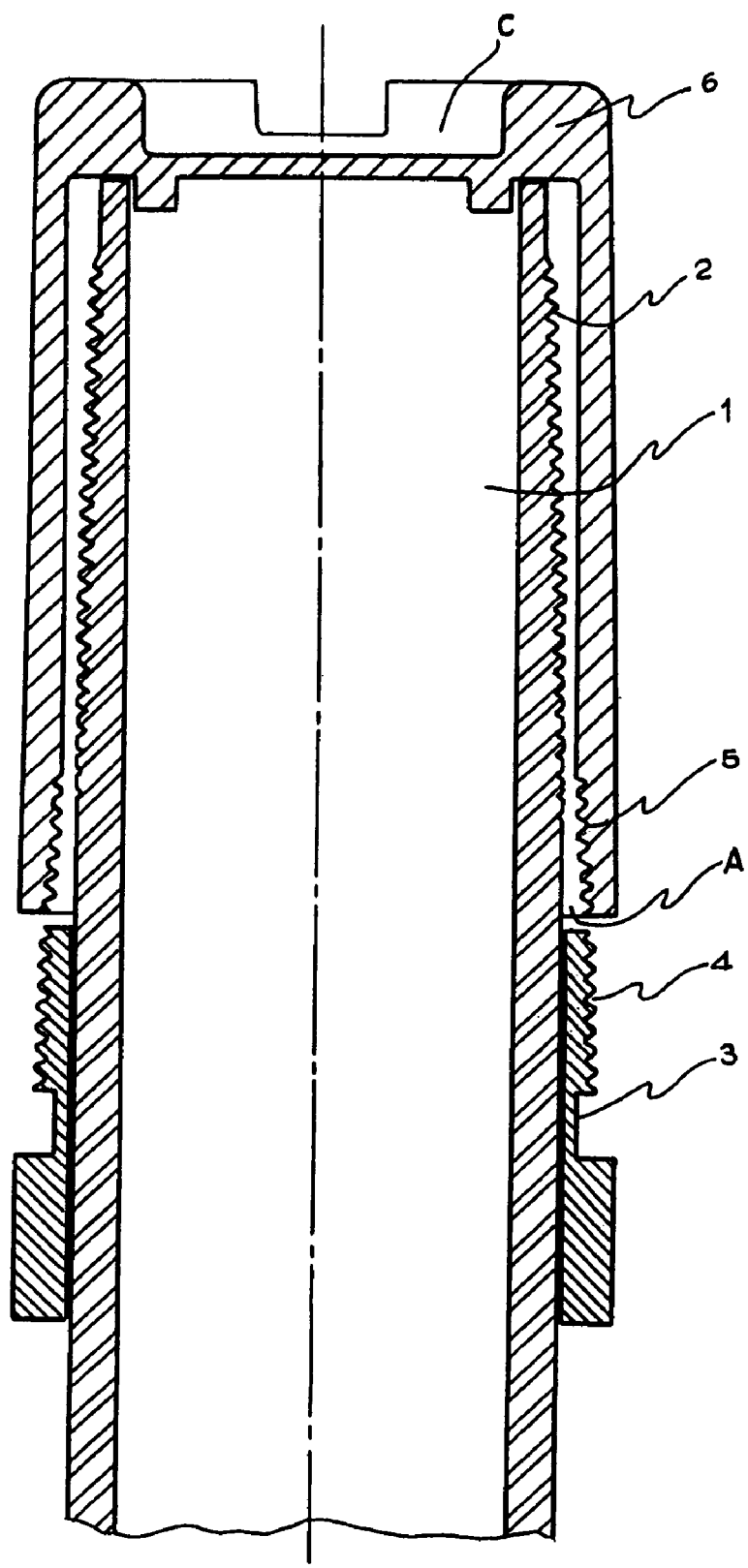
FIG. 1 illustrates a cross-section of an end of a tubular element which includes the protector according to the invention.

FIG. 1 shows one of the threaded ends 2 of a tubular element 1 over which a ring 3 is inserted wherein the external surface of one of the ends thereof includes a conical thread 4. One of the ends of threaded cap 6 is closed (C) and the other is open (A), the inner surface of the later including a conical thread 5 which matches that of said ring 3. Taper of both threads is preferably comprised between 0.06 and 0.08.

The threaded cap 6 is made from a deformable material, particularly a torque pressure-deformable one such as polyolefine, this latter being preferably a high density polyethylene comprised between 0.948 and 0.962 g/cm$^3$. Ring 3 is also manufactured from a torque pressure-deformable material such as a polyolefine, this latter being preferably a low density polyethylene comprised between 0.921 and 0.924 g/cm$^3$.

The protector according to the invention is used by screwing said threaded cap 6 on said ring 3. Due to the deformable material-conical thread combination, torque pressure exerted on said ring 3 allows this latter to copy the external shape of the tubular element 1, thus generating the desired protection.

Ring 3 is manufactured from one piece through die-casting or from two pieces by means of turning.

The protector according to the invention thence combines a torque pressure-deformable material with mutually matching conical threads, whereby universality is achieved for a wide range of tubular elements diameters, thus standardizing their manufacturing and lowering the stock of different varieties at threaded tubular elements recovery licensed stores, and consequently, lowering the number of protectors in stock. Preferably, and in order to absorb those impacts caused by handling and transportation of the tubular elements 1, the threaded cap 1 is covered by a metallic material, preferably a sheet 7.

Figure 2:
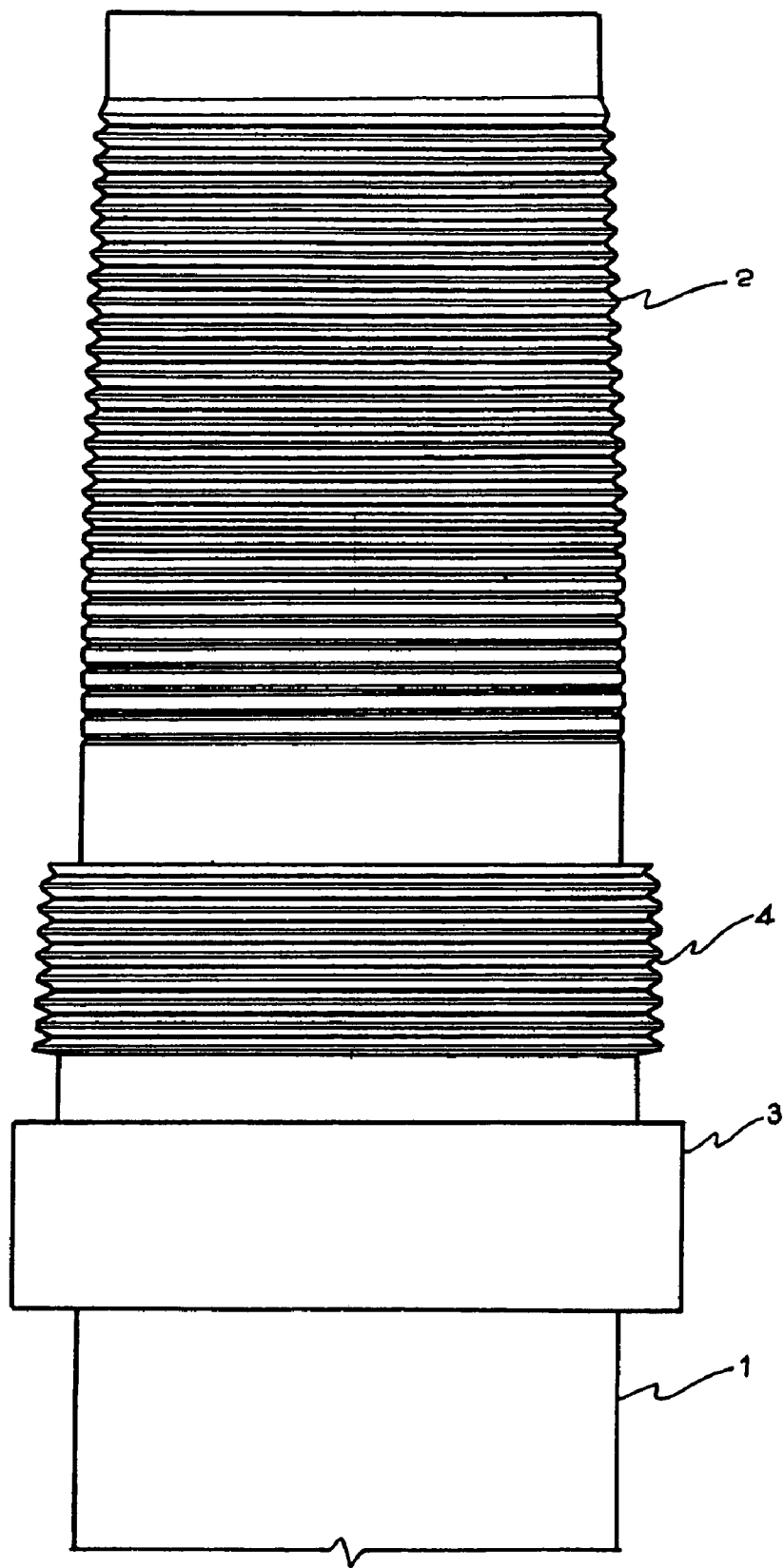
FIG. 2 is a view of the threaded end of a tubular element including a threaded ring according to the present invention.

FIG. 2 shows how the ring 3 is attached to the periphery of the tubular element 1, just beneath the threaded end of the latter.

Figure 3:
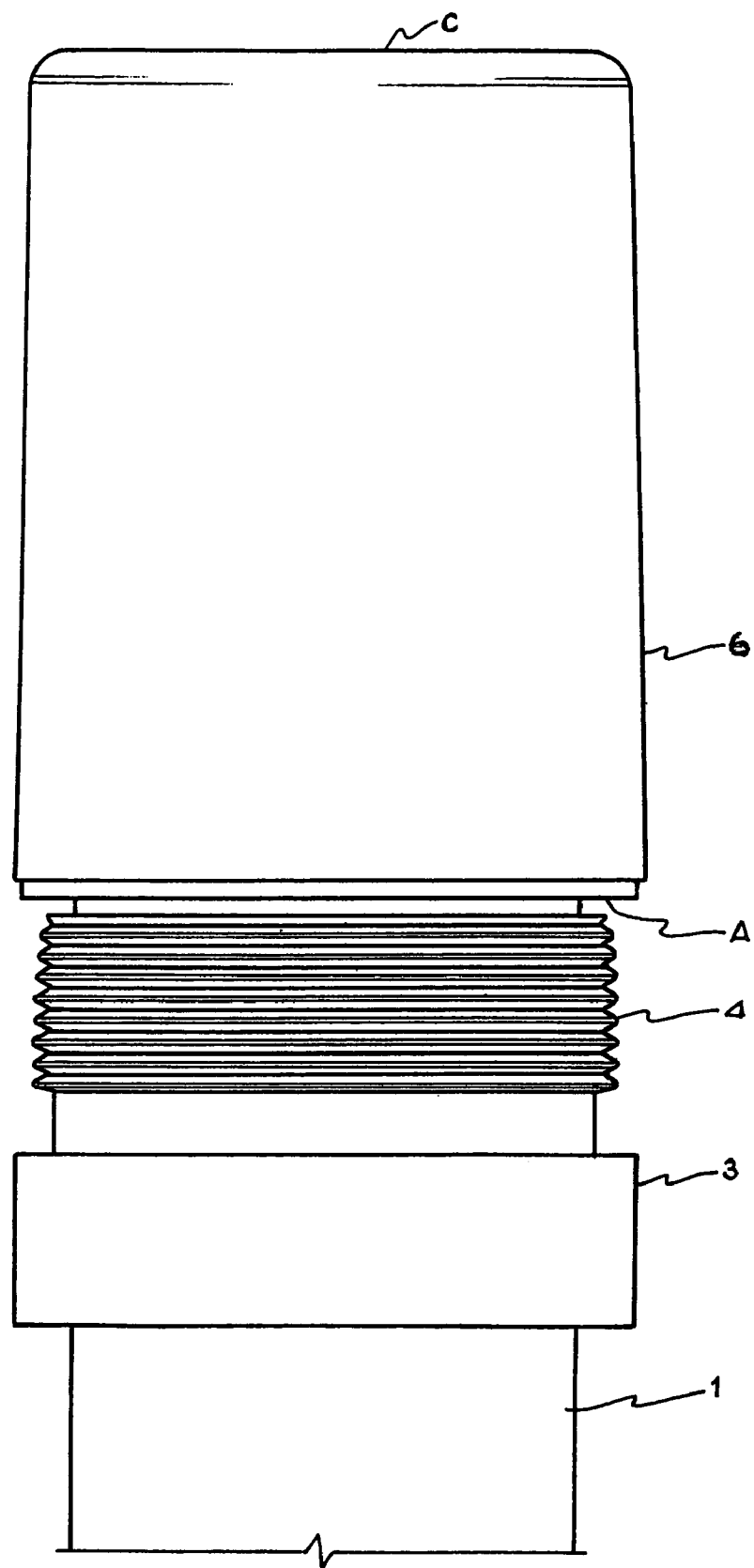
FIG. 3 shows the same threaded end which is now covered by the threaded cap which co-operates with FIG. 2 threaded ring.

FIG. 3 shows the insertion of the threaded cap 6 through the threaded end of said tubular element 1, to be further screwed on said ring 3.

Figure 4:
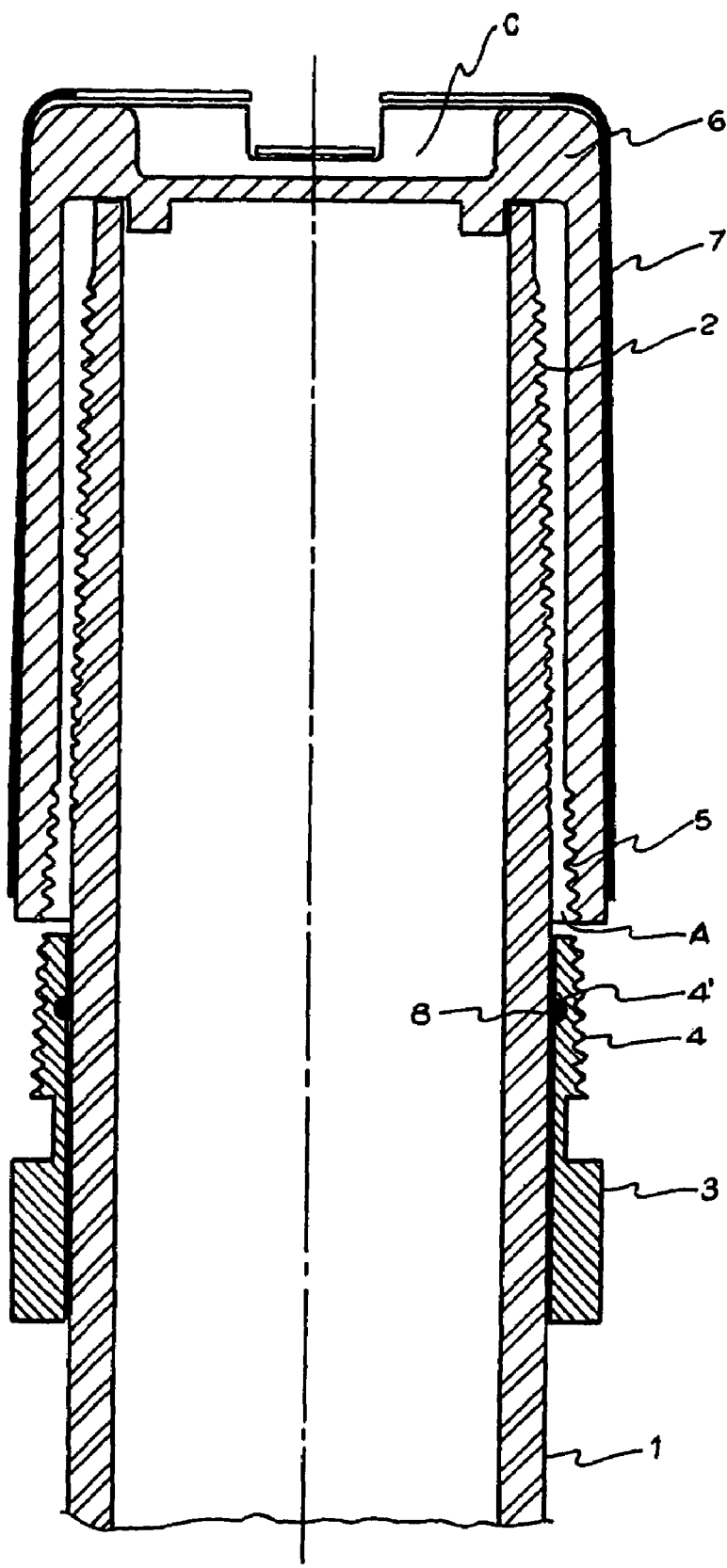
FIG. 4 shows another embodiment of the protector according to the invention which includes a ring which internal surface is provided with a seal and a threaded cap which external surface bears a metallic protector.

FIG. 4 shows another embodiment of the ring 3, which internal surface includes a peripheral groove 4' into which a seal 8 is inserted. Said seal is made from an elastomer and adopts the form of a joint, preferably an o'ring. The seal 8 increases the resistance against longitudinal movements due to axial load ("stripping") of the protector according to the invention once it is assembled in the threaded end 2 of tubular element 1; improving at the same time water and dust entering.

The invention claimed is:

1. A protector for the ends (2) of tubular elements (1), comprising:
   - a ring (3) attached spaced from an end of the tubular member made from a deformable material comprising a peripheral groove (4') made on the internal surface of said ring, into which a seal (8) is inserted, wherein the external surface of one of the ends of said ring has a conical thread (4); and
   - a threaded cap (6) made from a deformable material, which comprises a closed end (C) and an open end (A), wherein the internal surface of said open end (A) includes a conical thread (5) which matches that of the external end of said ring (3).

2. The protector according to claim 1, wherein the deformable material is a pressure-deformable material, preferably a polyolefine.

3. The protector according to claim 1, wherein said threaded cap (6) is a high density polyethylene, preferably comprised between 0.948 and 0.962 g/cm$^3$.

4. The protector according to claim 1, wherein said deformable material of said ring (3) is a low density polyethylene, preferably comprised between 0.921 and 0.924 g/cm$^3$.

5. The protector according to claim 1 wherein said seal (8) is an elastomer, which hardness is preferably comprised between 60 and 90 Shore A.

6. The protector according to claim 5, wherein said elastomer adopts the form of a joint, more particularly of an o-ring.

7. The protector according to claim 1, wherein said ring (3) is manufactured from one piece by means of die-casting or from two pieces by means of turning.

* * * * *